May 15, 1934.  R. D. RICHARDSON  1,958,864
MEASURING INSTRUMENT
Filed June 16, 1931
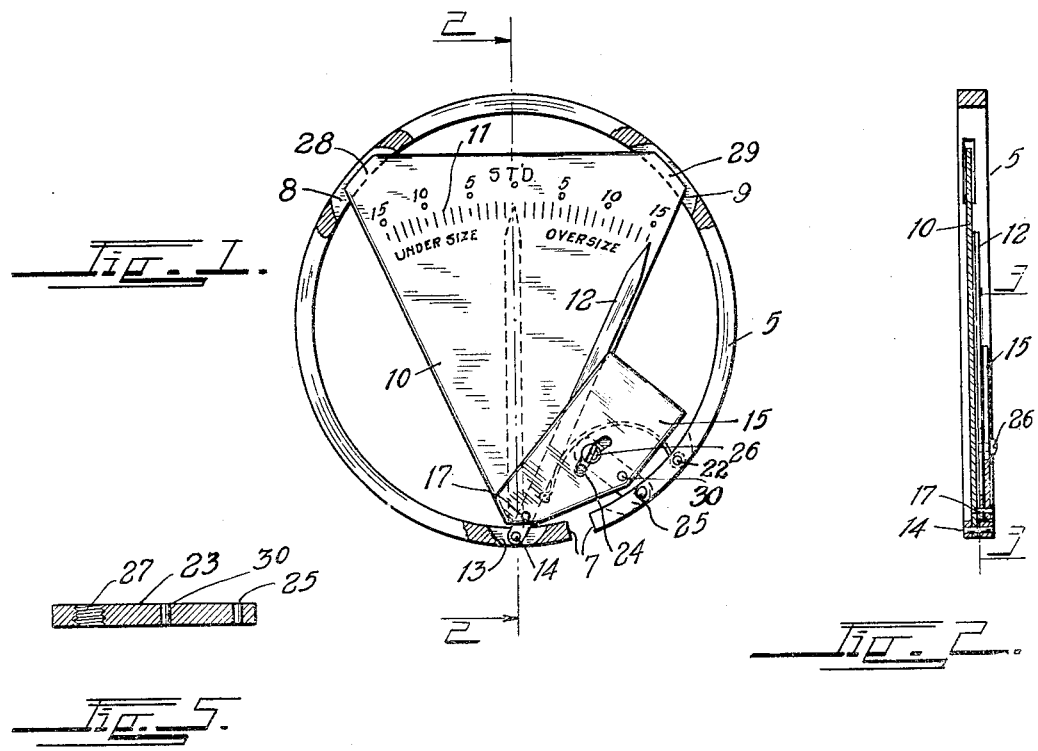
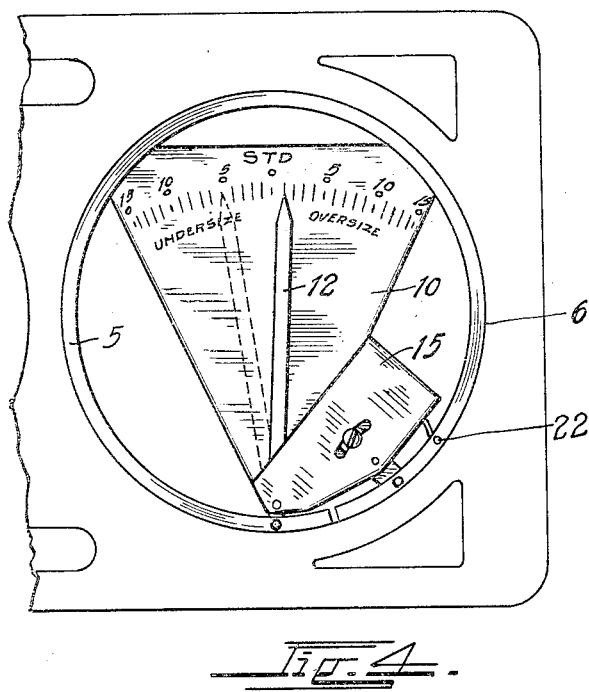
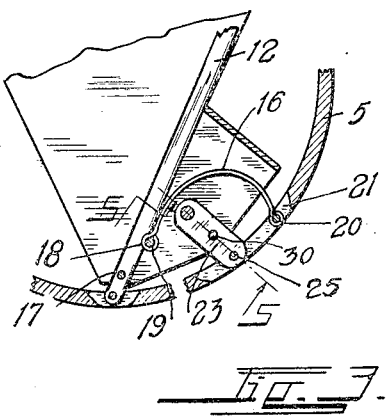
INVENTOR.
Raymond D. Richardson
BY Rollandet & Stratton
ATTORNEYS Patented May 15, 1934

1,958,864

UNITED STATES PATENT OFFICE 1,958,864

MEASURING INSTRUMENT

Raymond D. Richardson, Englewood, Colo., assignor to Lionel D. Bax, Denver, Colo.

Application June 16, 1931, Serial No. 544,724

8 Claims. (Cl. 33—179)

My invention relates to measuring instruments, and especially to instruments adapted to measure the size of a cylindrical opening.

An important object of the invention is to provide means to accurately measure such openings, without the aid of a micrometer, which requires considerable skill to operate.

A further important object of the invention is to provide an accurate instrument of the character described that will register on a dial the undersize and/or oversize of a cylindrical bore, in very small units of measure.

Still other objects reside in novel details of construction and in novel combinations and arrangements of parts, which will appear in the course of the following description.

In the drawing, like reference characters designate similar parts in the several views.

Figure 1 is a plan view of an embodiment of my invention, partly broken away, showing the normal, rest position.

Figure 2 is a section on the line 2—2 of Figure 1.

Figure 3 is a broken section on the line 3—3 of Figure 2.

Figure 4 is a plan of said embodiment in place in an engine cylinder.

Figure 5 is an enlarged section of a lug comprised in the invention, taken on the line 5—5 of Figure 3.

Referring more in detail to the drawing, the reference character 5 designates a contractible ring of flexible, resilient material, to be placed in an engine cylinder 6. In general, the ring is similar to an ordinary piston ring, but differs in some respects, which are noted hereinafter. The ring is split at 7, to permit contraction. The ring has slots 8, 9, 13 and 21, preferably sawed from the inside.

Mounted within the ring is a dial plate 10. The plate carries units of measure 11, and is graduated either way from zero. The abbreviation "STD", shown on the drawing, stands for "standard". The graduations represent 1/1000ths of an inch undersize or oversize, but of course this is arbitrary. If the bore is exactly the right size, the present device will register "0".

A pointer 12 is pivotally mounted in the slot 13 in the ring by means of a pin 14. The plate 10 has a bent over portion 15 that provides a housing for a spring 16. The part 15 has a curved slot 24. The pointer 12 is pivotally mounted between the plate 10 and the bent over portion 15 by a pin 17, and the housing provides a stop engaged by the pointer in its normal position of rest, as shown in Figure 1.

The pointer is recessed at 18, to receive a coiled end 19 of the spring. The other end of the spring carries a coil 20, which is inserted in the slot 21 in the ring and is held in place by a pin 22.

A lug 23, pivotally fastened in the slot 21 in the ring by a pin 25, is rigidly fastened in adjusted positions within the housing, by means of a screw 26 in the slot 24. The pin 25 is the center for the curve of the slot 24. The screw engages threads in an aperture 27 in the lug, and extends through the slotted opening 24 in the bent over portion of the plate 10. A pin 30 pivotally mounts the lug on the housing.

In the use of the invention, the device is inserted in a bore 6 to be measured, and the pointer, by cooperation with the scale indicates whether the bore is oversize or undersize and the amount of such variation.

When the ring is contracted, the pointer is moved across the graduated scale. Corners 28 and 29 of the plate are loose in the slots 8 and 9 of the ring, so that the contraction is not interfered with. The spring 16 prevents play in the movement of the pointer, in order that the measurements may be more accurate.

To compensate for wear and other causes of inaccuracy, the plate may be adjusted relative to the lug 23, by loosening the screw 26, moving the plate to a new position, and then tightening the screw.

It is to be understood that changes may be made in the details of construction and in the arrangement of parts without departing from the spirit and scope of the invention.

What I claim and desire to secure by Letters Patent is:

1. In a measuring instrument, a split, resilient ring, a dial plate within the ring, and a pointer disposed to cooperate with the dial, pivotally mounted on the plate and pivotally mounted on the ring at one side of the split, the plate being pivotally mounted on the ring at the other side of the split.

2. In a measuring instrument, a slotted, split ring, a dial plate movable in a slot in the ring, and a pointer disposed to cooperate with the dial and pivotally mounted on the plate and on the ring at one side of the split thereof, the plate being pivotally mounted on the ring at the other side of the split.

3. In a measuring instrument, a split, resilient ring, a dial plate within the ring, a lug on the ring at one side of the split portion and pivotally mounted on the dial plate, a screw adjustably fastening the lug to the plate, and a pointer pivotally connected with the ring at the other side of the split and pivotally connected with said plate.

4. In a measuring instrument, a split ring, a dial plate and a pointer within the ring, the plate being pivotally attached to the ring at one side of the split, the pointer being pivotally mounted on the ring at the other side of the split and the plate and the pointer being pivotally connected to each other.

5. In a measuring instrument, a split ring, a dial plate and a pointer within the ring, the plate being pivotally attached to the ring at one side of the split, one end of the pointer being pivotally mounted on the ring at the other side of the split and the plate and the pointer being pivotally connected to each other adjacent to the pivotal connection of the pointer with the ring, the free end of the pointer cooperating with the dial.

6. In a measuring instrument, a ring split for its compression, a dial plate and a pointer within the ring, the pointer cooperating with the dial, the dial plate and pointer being pivotally connected with the ring at opposite sides of the split and being pivotally connected with each other adjacent the ring whereby to measure the contraction of the ring.

7. An instrument for measuring cylindrical bores, comprising a slotted contractible ring adapted for insertion in a bore, a dial plate bearing a scale, the plate being pivoted on the ring and extending loosely in the slots of the same, and a pointer connected with the plate and the ring cooperating with the scale, to measure the degree of contraction of the ring by its engagement with the wall of the bore.

8. An instrument for measuring cylindrical bores, comprising a contractible split ring adapted for insertion in a bore, a dial plate bearing a scale, a lug on the plate, pivotally connected with the ring at one side of its split, means for fixing the lug in an adjustable position relative to the plate, and a pointer pivoted on the ring at the other side of its split and on the dial plate, in cooperative relation to the scale.

RAYMOND D. RICHARDSON.